United States Patent
Ishimoto (10) Patent No.: US 6,731,579 B2
(45) Date of Patent: May 4, 2004

(54) SIGNAL RECORDING APPARATUS, SIGNAL PLAYBACK APPARATUS AND CONTROLLING METHOD FOR LIMITING AN AMOUNT OF PARTICLES ON AN OPTICAL RECORDING MEDIUM PRIOR TO EXECUTING AN OPERATION

(75) Inventor: Tsutomu Ishimoto, Saitama (JP)

(73) Assignee: Sony Corporation, Tokyo (JP)

( * ) Notice: Subject to any disclaimer, the term of this patent is extended or adjusted under 35 U.S.C. 154(b) by 78 days.

(21) Appl. No.: 10/124,431

(22) Filed: Apr. 18, 2002

(65) Prior Publication Data

US 2002/0163869 A1 Nov. 7, 2002

(30) Foreign Application Priority Data

Apr. 19, 2001 (JP) .................................... 2001-121179

(51) Int. Cl.⁷ .................................................. G11B 7/00
(52) U.S. Cl. .................................. 369/53.37; 369/53.15
(58) Field of Search ........................... 369/53.37, 53.15, 369/112.01, 112.08, 112.13, 112.2, 112.21, 112.23, 112.27

(56) References Cited

U.S. PATENT DOCUMENTS 5,793,584 A * 8/1998 Knight et al. ............... 369/133

* cited by examiner

Primary Examiner—Nabil Hindi
(74) Attorney, Agent, or Firm—Oblon, Spivak, McClelland, Maier & Neustadt, P.C.

(57) ABSTRACT

A signal recording and/or playback apparatus is disclosed wherein, when near field light is used for recording or playback of an optical disk, dust on the optical disk can be removed effectively. After an optical disk is set in position to a turntable in an apparatus body, before gap control or the like is performed, the optical disk is rotated at a suitable speed so that dust sticking to the optical disk is driven away to the outer circumferential side thereby to clean the signal recording surface of the optical disk. Then, the optical disk is stopped once, and gap control for adjusting the distance or gap between an optical head and the optical disk to a distance with which near field light is produced is performed. Thereafter, it is confirmed whether or not the gap control operates normally, and when the gap control operates normally, the optical disk is rotated to start a recording operation or a playback operation of a signal onto or from the optical disk making use of the near field light.

18 Claims, 5 Drawing Sheets

NON-NEAR FIELD REGION

FIG. 4B

NEAR FIELD REGION

SIGNAL RECORDING APPARATUS, SIGNAL PLAYBACK APPARATUS AND CONTROLLING METHOD FOR LIMITING AN AMOUNT OF PARTICLES ON AN OPTICAL RECORDING MEDIUM PRIOR TO EXECUTING AN OPERATION

BACKGROUND OF THE INVENTION

This invention relates to a signal recording apparatus and a signal recording method for recording a signal onto an optical recording medium and a signal playback apparatus and a signal playback method for playing back a signal from an optical recording medium.

As one of signal recording apparatus and signal playback apparatus which use, for example, an optical disk as an optical recording medium, an apparatus has been proposed which makes use of near field light produced by an optical element such as an SIL (Solid Immersion Lens) formed from a two-group lens or an SIM (Solid Immersion Mirror) including a single lens. An apparatus of the type described is disclosed, for example, in U.S. patent application Ser. No. 09/385,956 assigned to the assignee of the present patent application.

Utilization of such near field light as mentioned above makes it possible to further reduce the spot diameter in accordance with the need for higher density recording of an optical disk.

For example, an SIL is a lens of a high refractive index interposed between a condensing lens and an optical disk and having a shape of a spherical lens partly cut away. The SIL lens is disposed such that the spherical surface thereof is directed to the condensing lens side while the other surface thereof is directed to a signal recording surface of the optical disk. A two-group lens is formed from a combination of the SIL and the condensing lens.

Where such an SIL as described above is interposed between the condensing lens and the optical disk, a numerical aperture greater than a numerical aperture of the condensing lens can be realized. Consequently, the spot diameter can be further reduced in size as described above.

In order to use such an SIL as described above to record or play back a signal onto or from an optical disk, it is necessary, for example, upon recording, to condense a recording laser beam upon the SIL while the SIL is moved toward the optical disk such that the distance between an end face thereof (the surface opposing to the optical disk) and the signal recording surface of the optical disk is sufficiently small to allow near field light to be produced (smaller than ½ the wavelength of the light, typically less than 200 nm) and then perform gap control to make the distance fixed to make the size of the condensed light spot on the optical disk fixed.

Incidentally, when such near field light is used for recording or playback of an optical disk, two procedures are conventionally available including a procedure wherein a gap controlling process for placing the optical head and the optical disk into a near field state before rotation of the optical disk is started after the optical disk is clamped by the apparatus (hereinafter referred to as first related art procedure) and another procedure wherein gap control is performed after rotation of the optical disk is started (hereinafter referred to as second related art procedure).

With the first related art procedure, however, there is the possibility that dust floating in the air may stick to the surface of the optical disk before/after the optical disk is clamped.

Accordingly, in the later process for establishing a near field state, that is, in the process of performing gap control between the optical head and the optical disk and then starting rotation of the optical disk, dust is sometimes caught between the optical head and the optical disk, resulting in failure of the gap control, and this sometimes disables later appropriate recording or playback.

In the worst case, the dust caught between the optical head and the optical disk may render the gap controlling operation unstable to such a degree that the optical head collides with and breaks the optical disk.

In order to prevent such sticking of dust as described above, it is a possible solution to cover the recording and/or playback apparatus with a clean booth to suppress dust which floats in the air around the recording and/or playback apparatus.

This solution, however, gives rise to another problem that an increased cost of equipment is required because the clean booth must be prepared.

Meanwhile, with the second related art procedure described above, if dust is present on the optical disk, then when the optical head is moved toward the disk in order to perform the gap control, the dust is caught between the optical head and the optical disk, rendering the gap control unstable.

In this instance, since the optical disk is rotating, there is the possibility that the optical disk may be damaged over an overall circumference. Further, if the optical head collides with the disk as a rotating body, then increased damage may be given to both of the optical head and the disk when compared with that when the disk stands still.

SUMMARY OF THE INVENTION

It is an object of the present invention to provide a signal recording apparatus, a signal playback apparatus and controlling methods for them wherein, when near field light is used for recording or playback of an optical disk, dust on the optical disk can be removed effectively and signal recording or signal playback based on stable gap control can be performed with a less expensive configuration.

It is another object of the present invention to provide a signal recording apparatus, a signal playback apparatus and controlling methods for them wherein, when near field light is used for recording or playback, a disk is rotated after gap control is performed thereby to allow recording or playback with near field light to be performed stably.

In order to attain the objects described above, according to an aspect of the present invention, there is provided a signal recording apparatus, including driving means for carrying and driving an optical recording medium to rotate, optical means disposed in the proximity of the optical recording medium for condensing near field light originating from a laser beam upon the optical recording medium, signal recording means for moving the optical means to a position in the proximity of the optical recording medium and using the near field light to record a signal onto the optical recording medium, and control means for controlling the driving means to rotate the optical recording medium before the optical means is moved to the position in the proximity of the optical recording medium by the signal recording means.

In the signal recording apparatus, the optical recording medium is rotated by the driving means under the operation control of the control means before the optical means is moved to the position in the proximity of the optical recording medium by the signal recording means.

Consequently, even if dust sticks to the optical recording medium or dust floats around the optical recording medium, such dust on the optical recording medium can be removed effectively by the rotation of the optical recording means before gap control for allowing recording of the optical recording medium to be performed subsequently using near field light is performed. Consequently, signal recording by stabilized gap control can be performed with a less expensive configuration.

According to another aspect of the present invention, there is provided a signal playback apparatus, including driving means for carrying and driving an optical recording medium to rotate, optical means disposed in the proximity of the optical recording medium for condensing near field light originating from a laser beam upon the optical recording medium, signal playback means for moving the optical means to a position in the proximity of the optical recording medium and using the near field light to play back a signal from the optical recording medium, and control means for controlling the driving means to rotate the optical recording medium before the optical means is moved to the position in the proximity of the optical recording medium by the signal playback means.

Also in the signal playback apparatus, the optical recording medium is rotated similarly by the driving means under the operation control of the control means before the optical means is moved to the position in the proximity of the optical recording medium by the signal recording means.

Consequently, even if dust sticks to the optical recording medium or dust floats around the optical recording medium, such dust on the optical recording medium can be removed effectively by the rotation of the optical recording means before gap control for allowing playback of the optical recording medium to be performed subsequently using near field light is performed. Consequently, signal playback by stabilized gap control can be performed with a less expensive configuration.

According to a further aspect of the present invention, there is provided a controlling method for a signal recording apparatus, including the steps of carrying and driving an optical recording medium to rotate thereby to remove dust on the optical recording medium, moving optical means disposed in the proximity of the optical recording medium to a position in the proximity of the optical recording medium so that near field light originating from a laser beam is condensed upon the optical recording medium, and recording a signal onto the optical recording medium using the near field light.

In the controlling method for a signal recording apparatus, the optical recording medium is rotated before the optical means is moved to the position in the proximity of the optical recording medium.

Consequently, even if dust sticks to the optical recording medium or dust floats around the optical recording medium, such dust on the optical recording medium can be removed effectively by the rotation of the optical recording means before gap control for allowing recording of the optical recording medium to be performed subsequently using near field light is performed. Consequently, signal recording by stabilized gap control can be performed with a less expensive configuration.

According to a still further aspect of the present invention, there is provided a controlling method for a signal playback apparatus, including the steps of carrying and driving an optical recording medium to rotate thereby to remove dust on the optical recording medium, moving optical means disposed in the proximity of the optical recording medium to a position in the proximity of the optical recording medium so that near field light originating from a laser beam is condensed upon the optical recording medium, and recording a signal onto the optical recording medium using the near field light.

Also in the controlling method for a signal playback apparatus, the optical recording medium is rotated before the optical means is moved to the position in the proximity of the optical recording medium.

Consequently, even if dust sticks to the optical recording medium or dust floats around the optical recording medium, such dust on the optical recording medium can be removed effectively by the rotation of the optical recording means before gap control for allowing playback of the optical recording medium to be performed subsequently using near field light is performed. Consequently, signal playback by stabilized gap control can be performed with a less expensive configuration.

BRIEF DESCRIPTION OF THE DRAWINGS

These and other objects of the invention will be seen by reference to the description, taken in connection with the accompanying drawing, in which.

DETAILED DESCRIPTION OF THE PREFERRED EMBODIMENT

Figure 1:
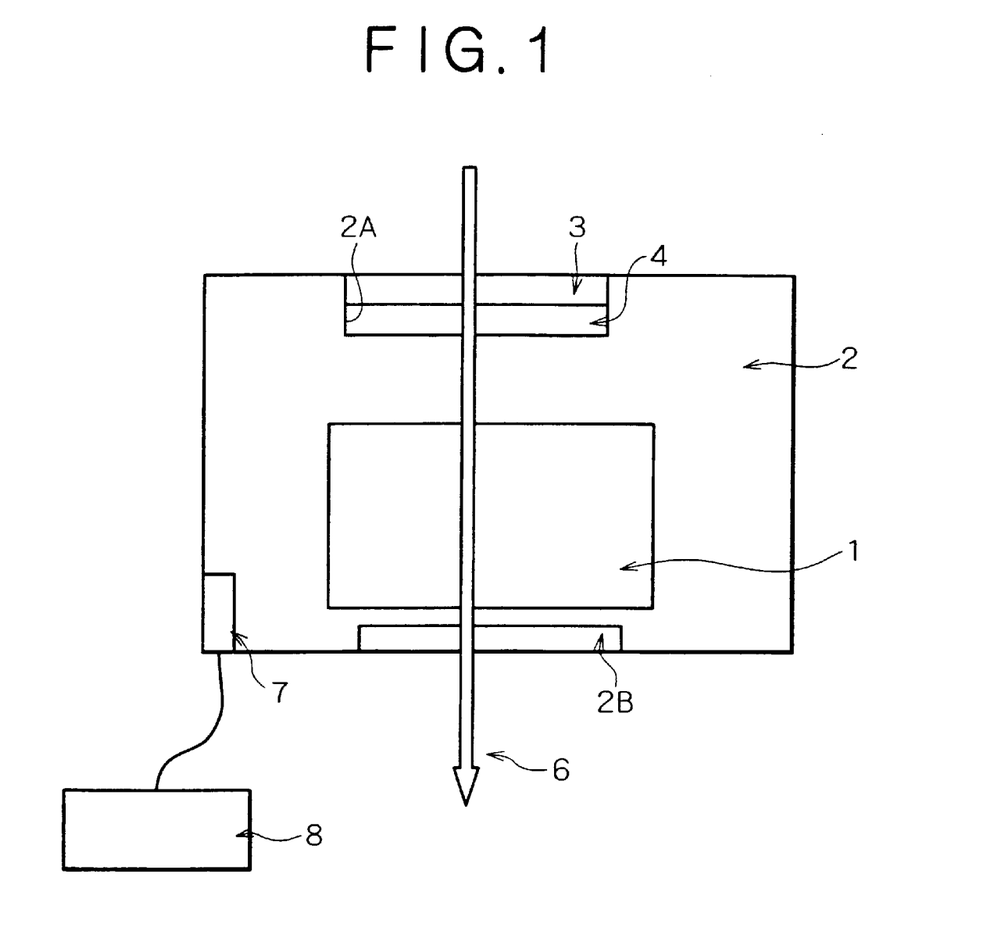
FIG. 1 is a schematic sectional view showing a mechanical configuration of a signal recording and/or playback apparatus to which the present invention is applied.
Figure 2:
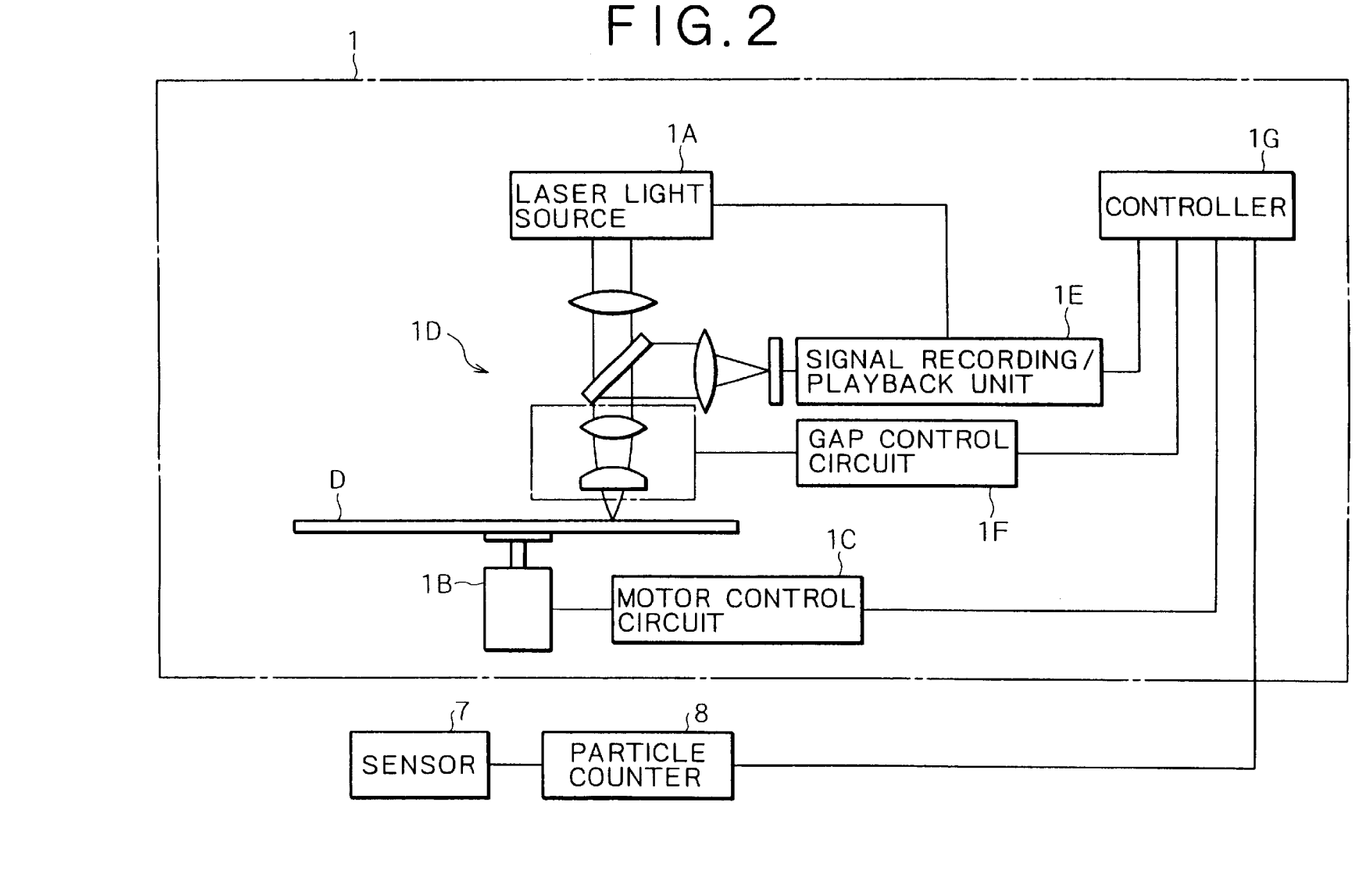
FIG. 2 is a block diagram showing an electrical configuration of the signal recording and/or playback apparatus to which the present invention is applied and which uses near field light shown in FIG. 1.

Referring now in detail to the drawings. FIG. 1 is a schematic sectional view showing a mechanical configuration of a signal recording and/or playback apparatus to which the present invention is applied and which uses near field light. FIG. 2 is a block diagram sowing an electrical configuration of the signal recording and/or playback apparatus to which the present invention is applied and which uses near field light.

In FIG. 2, the signal recording and/or playback apparatus includes a body 1 which in turn includes a laser light source 1A for emitting a laser beam to be supplied to an optical disk D as an optical recording medium, a spindle motor 1B for carrying the optical disk D on a turntable secured thereto and driving it to rotate at a high speed, a motor control circuit 1C for controlling the rotation of the spindle motor 1B, an optical head 1D serving as optical means including an SIL (Solid Immersion Lens) and an SIM (Solid Immersion Mirror) disposed in the proximity of a signal recording surface of the optical disk D carried on the turntable, a signal recording/playback unit 1E serving as signal recording and/or playback means for recording or playing back a signal with near field light using the optical head 1D, a gap control circuit 1F serving as gap control means for controlling the distance (gap) between the signal recording surface of the optical disk D and the optical head 1D to a fixed value, and a controller 1G serving as control means for controlling the entire signal recording and/or playback operation of the signal recording and/or playback apparatus.

In the signal recording and/or playback apparatus, the spindle motor 1B and the motor control circuit 1C cooperatively form a drive mechanism (driving means).

The controller 1G is connected to receive a result of counting of a particle counter 8 for counting an output of a sensor 7 which is hereinafter described.

It is to be noted that, while the signal recording and/or playback apparatus has both of a recording function and a playback function, the present invention can be applied similarly to an apparatus for exclusive use only for recording or playback.

As shown in FIG. 1, the body 1 described above is accommodated in a housing 2 with a dust-proof structure. An inlet port 2A is formed in a top wall of the housing 2, and a fan 3 and a filter 4 are fitted in the inlet port 2A. An exhaust port 2B is formed in a bottom wall of the housing 2.

The fan 3 takes external air into the housing 2 through the inlet port 2A and forms an air flow denoted by an arrow mark 6 in FIG. 1 which flows to the exhaust port 2B. The filter 4 is provided on the inner side of the fan 3 and prevents dust or like foreign elements in the external air taken in by the fan 3 from being admitted into the housing 2.

The particle counter 8 and the sensor 7 mentioned above are provided for the housing 2 and detect an amount of particles such as dust floating in the housing 2. An output of the sensor 7 is counted by the particle counter 8 to measure the amount of dust floating in the housing 2.

The signal recording and/or playback apparatus having such a configuration as described above uses such totally reflected light of a near field as hereinafter described to record or play back various kinds of information onto or from an optical disk. During such recording or playback operation, the particle counter 8 and the sensor 7 are used to detect particles floating in the housing 2 while the fan 3 is driven to take in the external air through the filter 4.

Figure 3:
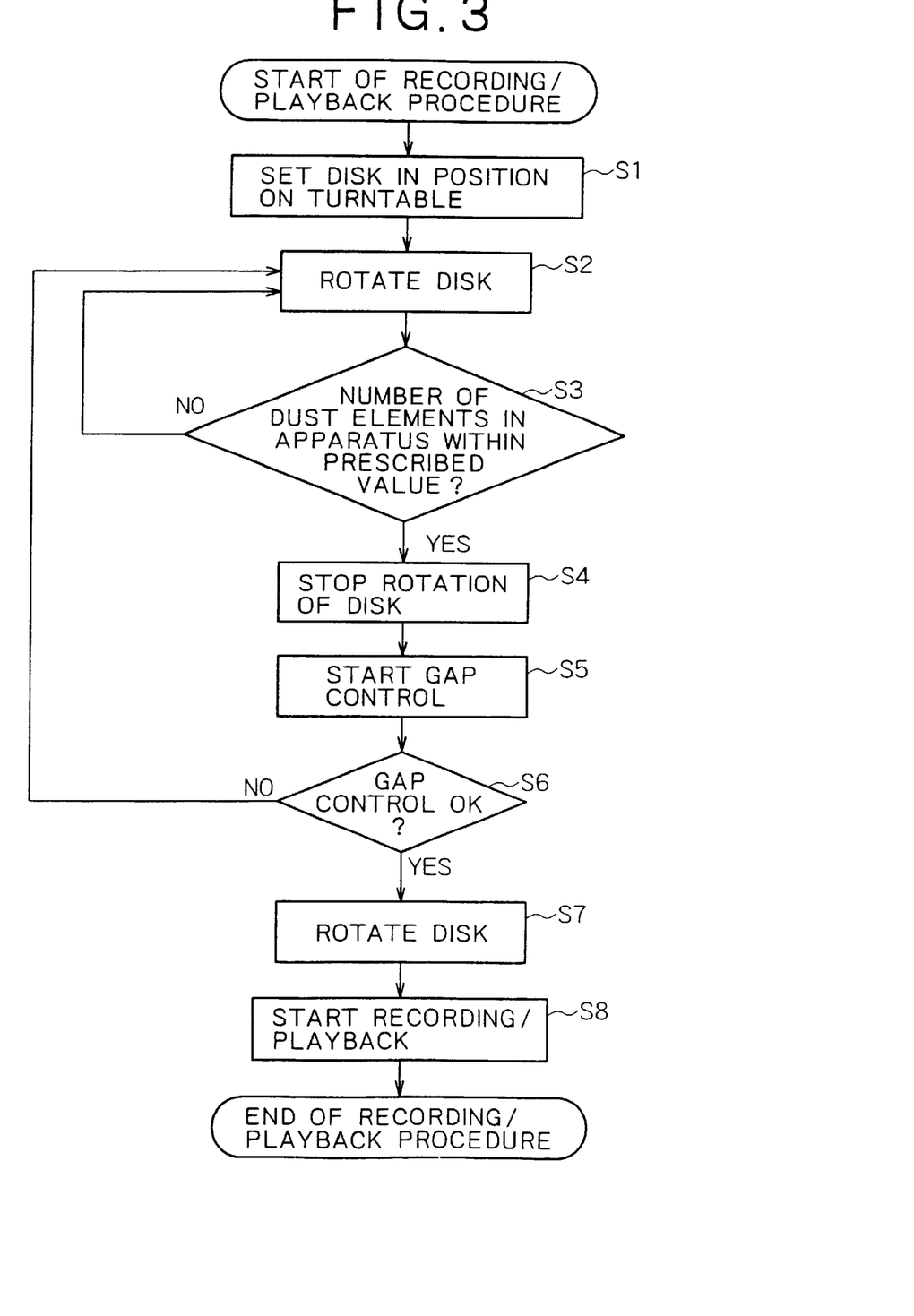
FIG. 3 is a flow chart illustrating a control procedure of a recording or playback operation of the signal recording and/or playback apparatus shown in FIG. 1.

FIG. 3 illustrates a control procedure of the recording and/or playback operation of the signal recording and/or playback apparatus described above.

Referring to FIG. 3, first at step S1, an optical disk is set in position to (clamped at) the turntable in the body 1 of the signal recording and/or playback apparatus in order to make it possible to subsequently perform recording or playback with near field light.

Then at step S2, the spindle motor 1B is controlled to rotate by the controller 1G and the motor control circuit 1C shown in FIG. 2. Consequently, the optical disk set in position in the body 1 is rotated at a suitable speed. By the rotation of the optical disk at step S2, dust sticking to the optical disk is driven away to the outer circumferential side thereby to clean the signal recording surface of the optical disk.

It is to be noted that the speed of rotation in this instance should be determined through an actual test or the like conducted to actually measure a speed at which dust and so forth can be removed effectively, and adopted for an actual apparatus.

Then at step S3, the controller 1G discriminates based on an output of the particle counter 8 described hereinabove whether or not the amount of dust floating in the air in the housing 2 is smaller than a prescribed value.

As a result of the rotation of the optical disk at step S2 described above, dust sticking to the optical disk is driven away into the air and floats in the housing 2. The floating dust is exhausted to the outside of the housing 2 by an air flow 6 formed by the fan 3 and the exhaust port 2B in the housing 2, and consequently, the amount of the floating dust gradually decreases.

The rotation of the optical disk at step S2 is repetitively executed by the controller 1G until the detected amount value of dust by the particle counter 8 becomes lower than the prescribed value at step S3.

Where the particle counter 8 used has a resolution of, for example, 0.1 $\mu$m, the rotation of the optical disk at step S2 is continued until after the detection amount value of dust whose size is 0.1 $\mu$m becomes equal to zero.

In this instance, for example, if the optical disk is rotated for approximately 2 minutes at 900 rpm, then the detection amount value of dust becomes equal to zero. After the detection amount value of dust becomes equal to zero, it is guaranteed that, even if some dust remains in the housing 2, any particle of the remaining dust has a size equal to or smaller than 0.1 $\mu$m.

Then at step S4, the controller 1G controls the motor control circuit 1C to stop the rotation of the optical disk once. Then at step S5, after the rotation of the optical disk stops, gap control for adjusting the distance (gap) between the optical head and the optical disk to a value with which near field light is produced is performed.

Then at step S6, the controller 1G confirms through the gap control circuit 1F whether or not the gap control operates normally. If the gap control does not operate normally, then there is the possibility that the gap control may have failed because dust still remains sticking to the optical disk or dust sticks to the optical disk newly before the gap controlling operation starts. Therefore, the processing returns to step S2.

On the other hand, if the controller 1G discriminates at step S6 that the cap control operates normally, then it performs rotation of the optical disk at step S7 and then controls the laser light source 1A and the signal recording/playback unit 1E to start a recording operation or a playback operation of a signal with near field light at step S8.

It is to be noted that, while, in the procedure described above, the gap control is performed while the optical disk stops, the gap control may otherwise be performed while the optical disk is rotating.

In the latter case, even if dust floating in the housing 2 newly drops onto the optical disk, the dust will be driven away by the rotation of the optical disk, and therefore, the gap control can be continued without a trouble.

Now, an example of detailed operation in recording or playback and gap control of an optical disk with near field light employed in the signal recording and/or playback apparatus described above is described.

Figure 4A:
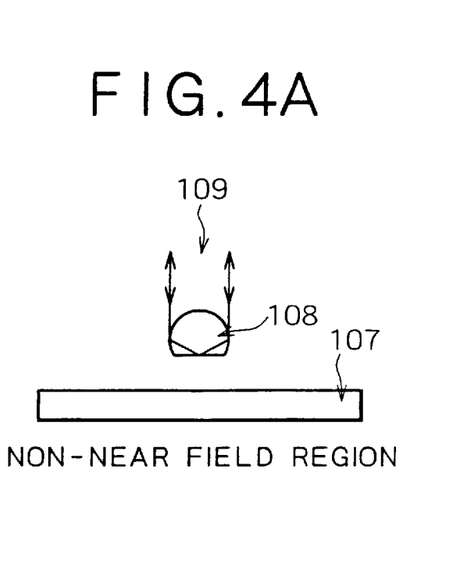
FIGS. 4A and 4B are schematic views illustrating an outline of gap control in which totally reflected light is used.
Figure 4B:
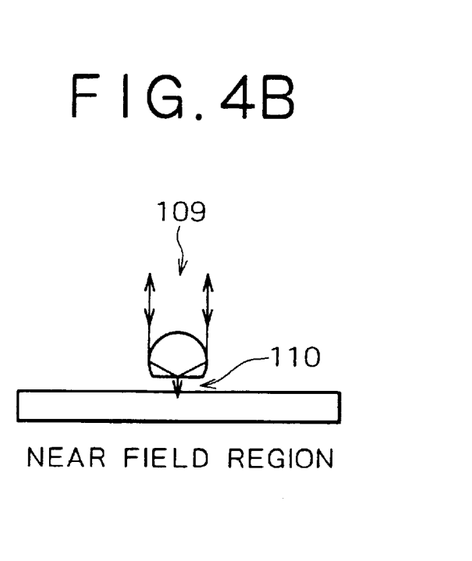

FIGS. 4A and 4B illustrate an outline of gap control where totally reflected light is used.

The head section of the information recording and/or playback apparatus which uses near field light employs, for example, a solid immersion lens (SIL) as an objective lens.

The SIL is used in combination (two-group lens) with a condensing lens (not shown) for introducing light into the SIL.

Referring first to FIG. 4A, there is illustrated a manner of incoming light when the SIL is in a non-near field region. The non-near field region is defined as a region wherein the distance between an optical disk 107 and an end face of the SIL 108 opposing to the optical disk 107 is generally greater than an approximately one half the wavelength $\lambda$ of an input waveform, for example, greater than 200 nm as a representative value.

In this instance, that portion of light incoming to the SIL 108 which enters at an angle greater than the angle of total reflection is totally reflected by the end face of the SIL 108, and consequently, it returns with the full light amount.

In contrast, FIG. 4B illustrates another manner of incoming light where the SIL 108 is in a near field region. The near field region is defined as a region wherein the distance between the optical disk 107 and the end face of the SIL 108 opposing to the optical disk 107 is smaller than 200 nm as the representative value.

In this instance, part of that portion of the light incoming to the SIL 108 which enters at an angle greater than the angle of total reflection is not totally reflected by the end face of the SIL 108 but oozes out as near field light 110 toward the optical disk 107.

Here, if the optical disk 107 is transparent, then the oozing out near field light 110 is admitted into the inside of the optical disk 107 without being reflected by the surface of the optical disk 107.

Accordingly, if this returning light amount is detected, then the distance (gap) between the SIL 108 and the optical disk 107 can be detected.

Figure 5:
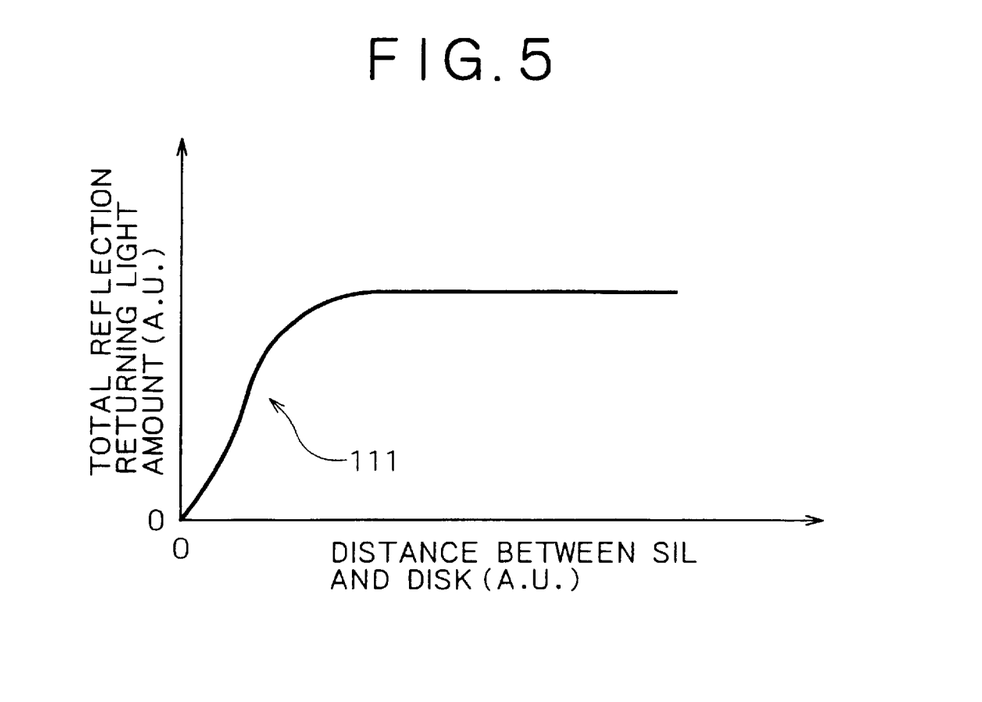
FIG. 5 is a diagram illustrating a relationship between the distance between an SIL and a disk and the total reflection returning light amount.

FIG. 5 illustrates a relationship between the distance between the SIL 108 and the optical disk 107 and the total reflection returning light amount 109. In FIG. 5, the axis of abscissa indicates the distance between the SIL and the disk, and the axis of ordinate indicates the returning light level. It is to be noted that the unit A.U. for the axis of abscissa and the axis of ordinate represents that it can be selected arbitrarily.

When the distance between the SIL 108 and the optical disk 107 falls within the near field region, part of the total reflection returning light amount 109 of the incoming light passes through the SIL 108 to the optical disk 107 side. Then, when the end face SIL 108 contacts with the optical disk 107, the full amount of the total reflection returning light amount 109 transmits through the SIL 108 to the optical disk 107 side. In other words, the total reflection returning light amount reduces to zero.

In a playback operation of an optical disk wherein such near field light as described above is used, it is necessary to keep the distance between the end face of the SIL 108 and the optical disk 107 fixedly to the distance with which such near field light 110 as described above is produced.

Therefore, a region 111 within which the distance between the SIL 108 and the optical disk 107 and the total reflection returning light amount 109 exhibit a linear relationship to each other in FIG. 5 is used to perform gap control using the total reflection returning light amount 109 as a control object amount.

Figure 6:
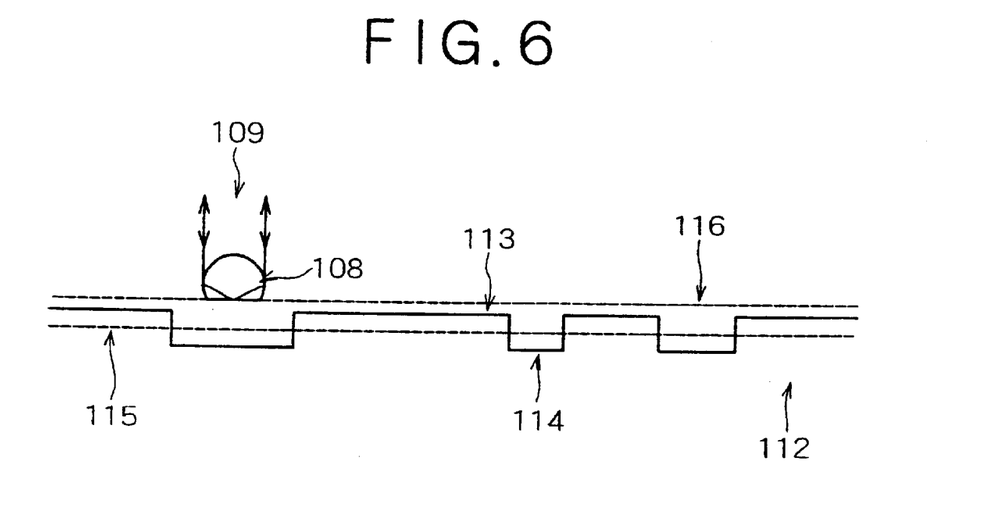
FIG. 6 is a schematic view illustrating a manner of gap control where information is recorded as a pit pattern on the surface of an optical disk.

FIG. 6 illustrates a manner of the gap control where information is recorded as a pit pattern on the surface of the optical disk 107.

If the SIL 108 scans the optical disk 107, then the distance between the SIL 108 and the optical disk 107 decreases at a land portion 113, but the distance between the SIL 108 and the optical disk 107 increases at a pit portion 114.

However, since the cycle frequency of the pit pattern (usually several MHz) is sufficiently high when compared with a gap control band (generally several kHz), the gap control does not follow up the pit pattern at all, and the distance between the SIL 108 and the optical disk 107 is held at a fixed distance (SIL end face control level) 116 from an average height 115 of the distances between the land portion 113 and the end face SIL 108 and between the pit portion 114 and the end face SIL 108.

Figure 7:
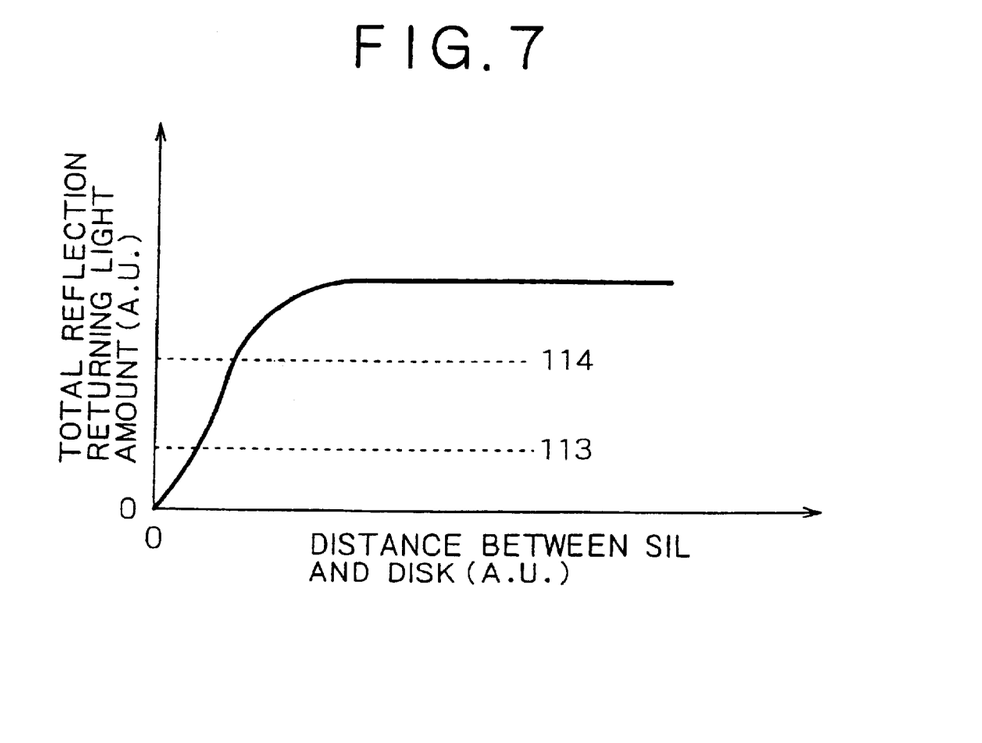
FIG. 7 is a diagram illustrating the totally reflected returning light level at a land portion and a pit portion of an optical disk.

FIG. 7 illustrates the total reflection returning light levels at the land portion 113 and the pit portion 114. In FIG. 7, the axis of abscissa indicates the distance between the SIL and the disk, and the axis of ordinate represents the returning light level.

As can be seen from FIG. 7, the information recorded as the pit pattern can be played back from the difference between the signal levels at the land portion 113 and the pit portion 114.

It is to be noted that, while it is described above that an SIL is used as the optical means of the head portion, an SIM (Solid Immersion Mirror) may otherwise be used similarly.

While a preferred embodiment of the present invention has been described using specific terms, such description is for illustrative purposes only, and it is to be understood that changes and variations may be made without departing from the spirit or scope of the following claims.

What is claimed is:

1. A signal recording apparatus, comprising:
    driving means for carrying and driving an optical recording medium to rotate;
    optical means disposed in the proximity of the optical recording medium for condensing near field light originating from a laser beam upon the optical recording medium;
    signal recording means for moving said optical means to a position in the proximity of the optical recording medium and using the near field light to record a signal onto the optical recording medium; and
    control means for controlling said driving means to rotate the optical recording medium before said optical means is moved to the position in the proximity of the optical recording medium by said signal recording means, wherein
    said control means controls said driving means to rotate the optical recording medium until after an amount of particles floating in said signal recording apparatus is less than a predetermined amount.

2. A signal recording apparatus according to claim 1, wherein said control means controls, after the optical recording medium is rotated by said driving means, said signal recording means to move said optical means to the position in the proximity of the optical recording medium, and controls said signal recording means to perform gap control between said optical means and the optical recording medium and then controls said signal recording means to start recording of a signal onto the optical recording medium.

3. A signal recording apparatus according to claim 1, further comprising detection means for detecting the amount of particles floating in said signal recording apparatus.

4. A signal recording apparatus according to claim 1, wherein said optical means includes a solid immersion lens.

5. A signal recording apparatus according to claim 1, wherein said optical means includes a solid immersion mirror.

6. A signal playback apparatus, comprising:

driving means for carrying and driving an optical recording medium to rotate;

optical means disposed in the proximity of the optical recording medium for condensing near field light originating from a laser beam upon the optical recording medium;

signal playback means for moving said optical means to a position in the proximity of the optical recording medium and using the near field light to play back a signal from the optical recording medium; and control means for controlling said driving means to rotate the optical recording medium before said optical means is moved to the positiop in the proximity of the optical recording medium by said signal playback means, wherein said control means controls said driving means to rotate the optical recording medium until after an amount of particles floating in said signal recording apparatus is less than a predetermined amount.

7. A signal playback apparatus according to claim 6, wherein said control means controls, after the optical recording medium is rotated by said driving means, said signal playback means to move said optical means to the position in the proximity of the optical recording medium, and controls said signal playback means to perform gap control between said optical means and the optical recording medium and then controls said signal playback means to start playback of a signal from the optical recording medium.

8. A signal playback apparatus according to claim 6, further comprising detection means for detecting the amount of particles floating in said signal recording apparatus.

9. A signal playback apparatus according to claim 6, wherein said optical means includes a solid immersion lens.

10. A signal playback apparatus according to claim 6, wherein said optical means includes a solid immersion mirror.

11. A controlling method for a signal recording apparatus, comprising the steps of:

driving an optical recording medium to rotate thereby to remove dust on the optical recording medium;

moving optical means to a position in the proximity of the optical recording medium so that near field light originating from a laser beam is condensed upon the optical recording medium; and recording a signal onto the optical recording medium using the near field light, wherein said driving step rotates the optical recording medium until an amount of particles floating in said signal recording apparatus is less than a predetermined amount.

12. A controlling method for a signal recording apparatus according to claim 11, further comprising the step of controlling a gap between said optical means and the optical recording medium before recording of a signal onto the optical recording medium is started after said optical means is moved to the position in the proximity of the optical recording medium.

13. A controlling method for a signal recording apparatus according to claim 12, wherein the gap controlling step is performed while the optical recording medium is in a stopping state.

14. A controlling method for a signal recording apparatus according to claim 12, wherein the gap controlling step is performed while the optical recording medium is being rotated.

15. A controlling method for a signal playback apparatus, comprising the steps of:

driving an optical recording medium to rotate thereby to remove dust on the optical recording medium;

moving optical means to a position in the proximity of the optical recording medium so that near field light originating from a laser beam is condensed upon the optical recording medium; and reproducing a signal from the optical recording medium using the near field lights wherein said driving step rotates the optical recording medium until an amount of particles floating in said signal recording apparatus is less than a predetermined amount.

16. A controlling method for a sigmil playback apparatus according to claim 15, further comprising the step of controlling a gap between said optical means and the optical recording medium before playback of a signal from the optical recording medium is started after said optical means is moved to the position ip the proximity of the optical recording medium.

17. A controlling method for a signal playback apparatus according to claim 16, wherein the gap controlling step is performed while the optical recording medium is in a stopping state.

18. A controlling method for a signal playback apparatus according to claim 16, wherein the gap controlling step is performed while the optical recording medium is being rotated.

* * * * *

UNITED STATES PATENT AND TRADEMARK OFFICE
CERTIFICATE OF CORRECTION

PATENT NO.    : 6,731,579 B2
DATED         : May 4, 2004
INVENTOR(S)   : Ishimoto It is certified that error appears in the above-identified patent and that said Letters Patent is hereby corrected as shown below:

Column 4,
Line 55, change "a block diagram sowing" to -- a block diagram showing --

Column 10,
Line 34, change "method for a sigmal" to -- method for a signal --
Line 39, change "the position ip" to -- the position in --

Signed and Sealed this

Seventeenth Day of August, 2004

JON W. DUDAS
*Acting Director of the United States Patent and Trademark Office*